United States Patent
John et al.

(10) Patent No.: US 11,834,952 B2
(45) Date of Patent: Dec. 5, 2023

(54) EXHAUST FREQUENCY MITIGATION APPARATUS

(71) Applicant: General Electric Company, Schenectady, NY (US)

(72) Inventors: Joshy John, Bengaluru (IN); Srinivas Pakkala, Chintalapudi (IN); Prabaharan K, Bengaluru (IN); Satish Kumar, Bengaluru (IN); Prakash Bavanjibhai Dalsania, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/834,326

(22) Filed: Jun. 7, 2022

(65) Prior Publication Data
US 2023/0279778 A1  Sep. 7, 2023

(30) Foreign Application Priority Data

Mar. 2, 2022  (IN) .............................. 202211011317

(51) Int. Cl.
*F01D 25/30* (2006.01)
*F01D 9/04* (2006.01)

(52) U.S. Cl.
CPC .............. *F01D 9/04* (2013.01); *F01D 25/30* (2013.01); *F05D 2240/126* (2013.01); *F05D 2250/232* (2013.01); *F05D 2260/96* (2013.01)

(58) Field of Classification Search
CPC .... F01D 5/145; F01D 25/30; F05D 2240/126; F05D 2250/232; F02K 1/04; F02K 1/386
See application file for complete search history.

(56) References Cited

U.S. PATENT DOCUMENTS

| | | | |
|---|---|---|---|
| 2,648,353 A * | 8/1953 | Haworth | D06C 5/00 415/207 |
| 2,844,001 A | 7/1958 | Alford | |
| 4,898,512 A | 2/1990 | Geffs | |
| 7,272,930 B2 * | 9/2007 | Wiebe | F02C 6/18 60/770 |
| 8,647,057 B2 * | 2/2014 | Orosa | F01D 25/305 415/182.1 |
| 9,115,602 B2 * | 8/2015 | Malandra | F01D 25/30 |
| 9,644,497 B2 * | 5/2017 | Salunkhe | F01D 25/243 |
| 2007/0009352 A1 | 1/2007 | Faile et al. | |

(Continued)

OTHER PUBLICATIONS

European Search Report Corresponding to U.S. Appl. No. 23/156,410 dated Jul. 21, 2023.

*Primary Examiner* — Courtney D Heinle
*Assistant Examiner* — Danielle M. Christensen
(74) *Attorney, Agent, or Firm* — Dority & Manning, P.A.

(57) ABSTRACT

Exhaust frequency mitigation apparatus, exhaust diffusers, and turbomachines are provided. An exhaust frequency mitigation apparatus includes a main body extending along an axial centerline from a base to a tip. the base defines a first diameter and the tip defining a second diameter. the main body converges from the first diameter to the second diameter with respect to the axial centerline. The base is configured to extend from an inner shell of a turbomachine exhaust diffuser. The exhaust frequency mitigation apparatus further includes at least one rib extending from a root coupled to the main body to a free end.

19 Claims, 6 Drawing Sheets

(56) References Cited

U.S. PATENT DOCUMENTS

| | | | |
|---|---|---|---|
| 2013/0170972 A1* | 7/2013 | Broeker | F01D 5/145 415/207 |
| 2015/0167693 A1* | 6/2015 | Yamasaki | F01D 25/30 415/211.2 |
| 2019/0292910 A1* | 9/2019 | Nagai | F02C 7/00 |

* cited by examiner

EXHAUST FREQUENCY MITIGATION APPARATUS

PRIORITY STATEMENT

The present application claims priority to Indian Provisional Patent Application Serial No. 202211011317, filed Mar. 2, 2022, which is incorporated by reference herein in its entirety.

FIELD

The present disclosure relates generally to frequency mitigation in exhaust diffusers. Specifically, the present disclosure is related to an apparatus for mitigating frequency oscillations within a turbomachine exhaust diffuser.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases are then exhausted from the turbine section through an exhaust diffuser positioned downstream from the turbine section.

The exhaust diffuser typically includes an inner shell and an outer shell that is radially separated from the inner shell to form an exhaust flow passage through the diffuser. One or more generally airfoil shaped diffuser struts extend between the inner and outer shells within the exhaust flow passage to provide structural support to the outer shell and/or to an aft bearing that supports the shaft.

Typical power generating turbomachines are capable of enormous power output, and as such, are often operated at part or partial load to satisfy demand. However, operating at part or partial load can result in frequency oscillations (i.e., pressure pulsations) within the exhaust diffuser that could cause damages over time or result in a shutdown of the turbomachine.

Accordingly, an improved exhaust diffuser that prevents or eliminates frequency oscillations at part or partial load operating conditions is desired and would be appreciated in the art.

BRIEF DESCRIPTION

Aspects and advantages of the exhaust frequency mitigation apparatus, exhaust diffusers, and turbomachines in accordance with the present disclosure will be set forth in part in the following description, or may be obvious from the description, or may be learned through practice of the technology.

In accordance with one embodiment, an exhaust frequency mitigation apparatus is provided. The exhaust frequency mitigation apparatus includes a main body extending along an axial centerline from a base to a tip. The base defines a first diameter and the tip defining a second diameter. The main body converges from the first diameter to the second diameter with respect to the axial centerline. The base is configured to extend from an inner shell of a turbomachine exhaust diffuser. The exhaust frequency mitigation apparatus further includes at least one rib that extends from a root coupled to the main body to a free end.

In accordance with another embodiment, an exhaust diffuser is provided. The exhaust diffuser includes an inner shell and an outer shell. The outer shell is radially spaced apart from the inner shell such that an exhaust flow passage is defined therebetween. The exhaust diffuser further includes one or more struts disposed within the exhaust flow passage and extending between the inner shell and the outer shell. The exhaust diffuser further includes an exhaust frequency mitigation apparatus that extends from the inner shell. The exhaust frequency mitigation apparatus includes a main body extending along an axial centerline from a base to a tip. The base defines a first diameter and the tip defining a second diameter. The main body converges from the first diameter to the second diameter with respect to the axial centerline. The exhaust frequency mitigation apparatus further includes at least one rib that extends from a root coupled to the main body to a free end.

In accordance with yet another embodiment, a turbomachine is provided. The turbomachine includes a compressor section, a combustion section disposed downstream of the compressor section, and a turbine section disposed downstream of the combustion section. The turbomachine further includes an exhaust diffuser disposed downstream of the turbine section. The exhaust diffuser includes an inner shell and an outer shell. The outer shell is radially spaced apart from the inner shell such that an exhaust flow passage is defined therebetween. The exhaust diffuser further includes one or more struts disposed within the exhaust flow passage and extending between the inner shell and the outer shell. The exhaust diffuser further includes an exhaust frequency mitigation apparatus that extends from the inner shell. The exhaust frequency mitigation apparatus includes a main body extending along an axial centerline from a base to a tip. The base defines a first diameter and the tip defining a second diameter. The main body converges from the first diameter to the second diameter with respect to the axial centerline. The exhaust frequency mitigation apparatus further includes at least one rib that extends from a root coupled to the main body to a free end.

These and other features, aspects and advantages of the present exhaust frequency mitigation apparatus, exhaust diffusers, and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present exhaust frequency mitigation apparatus, exhaust diffusers, and turbomachines, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present exhaust frequency mitigation apparatus, exhaust diffusers, and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
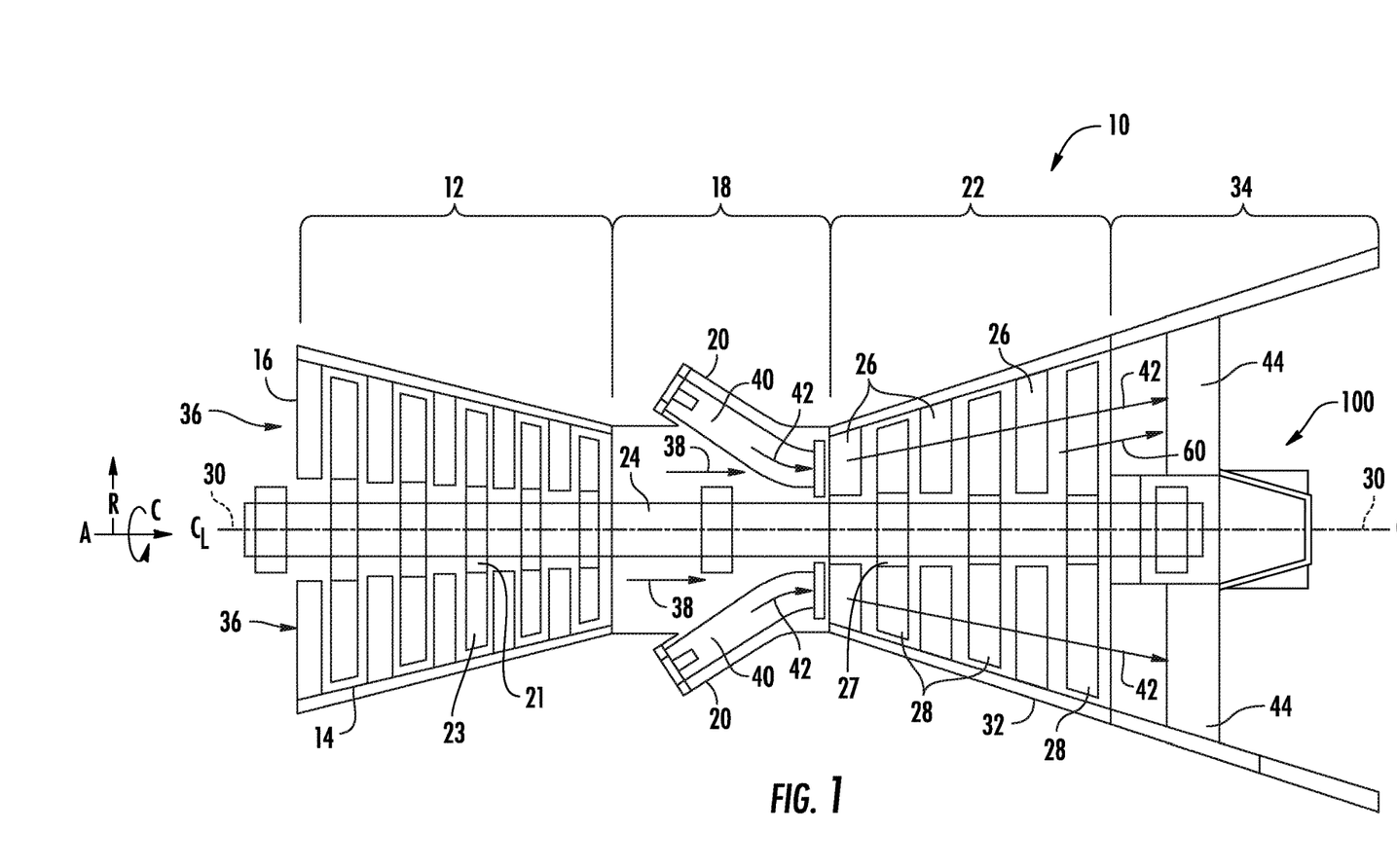
FIG. 1 is a schematic illustration of a turbomachine in accordance with embodiments of the present disclosure.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the invention as described herein may be used in any type of turbomachine including but not limited to a steam turbine, an aircraft gas turbine, or a marine gas turbine.

As shown, the gas turbine 10 generally includes a compressor section 12. The compressor section 12 includes a compressor 14. The compressor includes an inlet 16 that is disposed at an upstream end of the gas turbine 10. The gas turbine 10 further includes a combustion section 18 having one or more combustors 20 disposed downstream from the compressor section 12. The gas turbine further includes a turbine section 22 that is downstream from the combustion section 18. A shaft 24 extends generally axially through the gas turbine 10.

The compressor section 12 may generally include a plurality of rotor disks 21 and a plurality of rotor blades 23 extending radially outwardly from and connected to each rotor disk 21. Each rotor disk 21 in turn may be coupled to or form a portion of the shaft 24 that extends through the compressor section 12.

The turbine section 22 may generally include a plurality of rotor disks 27 and a plurality of rotor blades 28 extending radially outwardly from and being interconnected to each rotor disk 27. Each rotor disk 27 in turn may be coupled to or form a portion of the shaft 24 that extends through the turbine section 22. The turbine section 22 further includes an outer casing 32 that circumferentially surrounds the portion of the shaft 24 and the rotor blades 28. The turbine section 22 may include stationary nozzles 26 extending radially inward from the outer casing 32. The rotor blades 28 and stationary nozzles 26 may be arranged in alternating stages along an axial centerline 30 of gas turbine 10.

In operation, ambient air 36 or other working fluid is drawn into the inlet 16 of the compressor 14 and is progressively compressed to provide a compressed air 38 to the combustion section 18. The compressed air 38 flows into the combustion section 18 and is mixed with fuel to form a combustible mixture. The combustible mixture is burned within a combustion chamber 40 of the combustor 20, thereby generating combustion gases 42 that flow from the combustion chamber 40 into the turbine section 22. Energy (kinetic and/or thermal) is transferred from the combustion gases 42 to the rotor blades 28, causing the shaft 24 to rotate and produce mechanical work.

The combustion gases 42 exit the turbine section 22 and flow through the exhaust diffuser 34 across a plurality of struts 44 that are disposed within the exhaust diffuser 34. During various operating conditions of the gas turbine 10, such as during part-load operation, the combustion gases 42 flowing into the exhaust diffuser 34 from the turbine section 22 has a high level of swirl that is caused by the rotating turbine rotor blades 28. Such swirling flow can cause pressure fluctuations, frequency oscillations, or acoustic vibrations. In accordance with embodiments of the present disclosure, the gas turbine 10 may include an exhaust frequency mitigation apparatus 100 coupled to the exhaust diffuser 34 for reducing and/or entirely eliminating the pressure fluctuations, frequency oscillations, and/or vibrations caused by the swirling exhaust gas flow.

The gas turbine 10 may define a cylindrical coordinate system having an axial direction A extending along the axial centerline 30, a radial direction R perpendicular to the axial centerline 30, and a circumferential direction C extending around the axial centerline 30.

Figure 2:
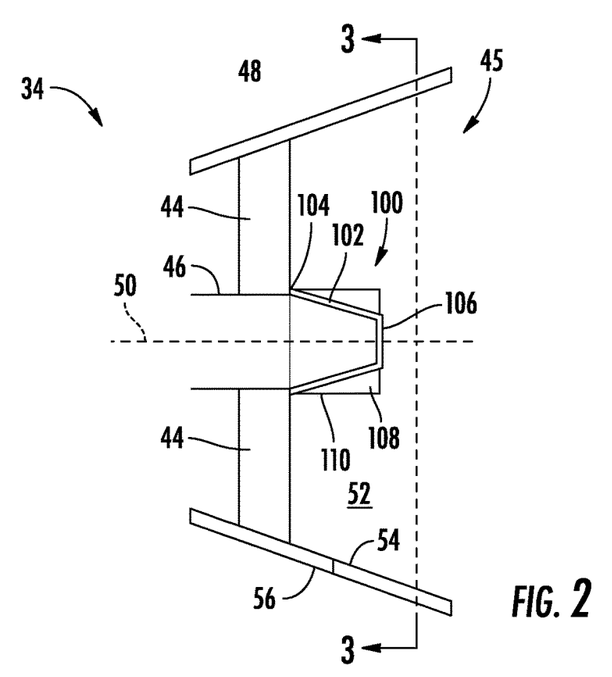
FIG. 2 illustrates an enlarged cross-sectional view of an exhaust diffuser in accordance with embodiments of the present disclosure.
Figure 3:
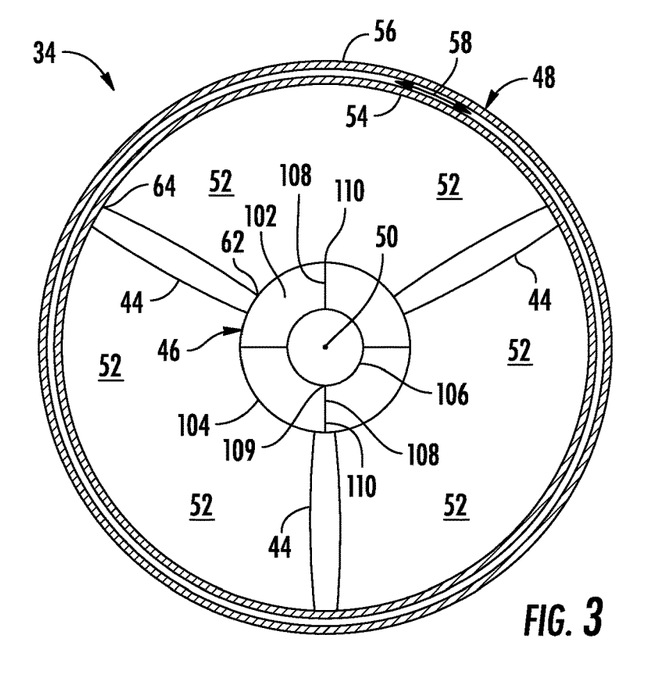
FIG. 3 illustrates a cross-sectional view of the exhaust diffuser from along the line 3-3 shown in FIG. 2, in accordance with embodiments of the present disclosure in accordance with embodiments of the present disclosure.

FIG. 2 illustrates a cross-sectional view of an exhaust diffuser 34, and FIG. 3 illustrates a cross-sectional view of the exhaust diffuser 34 from along the line 3-3 shown in FIG. 2, in accordance with embodiments of the present disclosure. As shown, the exhaust diffuser 34 generally includes an inner shell 46 and an outer shell 48. The inner shell 46 may extend generally axially along an axial centerline 50 of the exhaust diffuser 34. The axial centerline 50 of the exhaust diffuser 34 may be coaxial with the axial centerline 30 of the gas turbine 10. The inner shell 46 is generally annular shaped and may at least partially surround rotating components. For example, the inner shell 46 may surround or encase a portion of the shaft 24 (shown in FIG. 1).

In many embodiments, the outer shell 48 may be radially separated from the inner shell 46, such that an exhaust flow passage 52 is defined between the inner shell 46 and the outer shell 48. In particular embodiments, the inner shell 46 is concentrically and coaxially aligned within the outer shell 48 with respect to the axial centerline 50. In certain embodiments, the outer shell 48 may have a double walled construction, with an inner casing 54 that is radially separated from an outer casing 56. A compressed working fluid plenum 58 may be defined between within the outer casing 56. For example, the compressed working fluid plenum 58 may be at least partially defined between the inner casing 54 and the outer casing 56. In other embodiments, the compressed working fluid plenum 58 may be defined within the inner casing 54. The present disclosure is not limited to any particular size, shape, material, or other physical characteristics of the inner shell 46, the outer shell 48 and/or the inner or outer casings 54, 56, except as recited in the claims.

Each of the diffuser struts 44 may extend between the inner shell 46 and the outer shell 48 and within the exhaust flow passage 52 defined therebetween. The diffuser struts 44 are spaced circumferentially around the inner shell 46, and the diffuser struts 44 may orient, align, or otherwise center inner shell 46 within the outer shell 48. In addition, the diffuser struts 44 may provide structural support between the inner and the outer shells 46, 48. As shown in FIG. 1, the diffuser struts 44 are positioned relative to a direction of flow 60 of the combustion gases 42 flowing from the turbine section 22 of the gas turbine 10. As shown in FIG. 3, each diffuser strut 44 generally includes a root portion 62 that is connected to the inner shell 46, and a tip portion 64 radially separated from the root portion 62. The tip portion 64 may be connected to the outer shell 48 and/or to the inner casing 54.

As shown in FIGS. 2 and 3, exhaust diffuser 34 may include an exhaust frequency mitigation apparatus 100 coupled to, and extending axially from, the inner shell 46. The exhaust frequency mitigation apparatus 100 may be disposed downstream of the struts 44 and may extend coaxially with the axial centerline 50 of the exhaust diffuser 34 (and coaxially with the axial centerline 30 of the gas turbine 10 in some embodiments). Particularly, the exhaust frequency mitigation apparatus 100 may be disposed axially between the struts 44 and an outlet 45 of the exhaust diffuser 34. Stated otherwise, the exhaust frequency mitigation apparatus 100 may be disposed downstream of the struts 44 and upstream of an outlet 45 of the exhaust diffuser 34 with respect to the flow of combustion gases 42. In many embodiments, exhaust frequency mitigation apparatus 100 may include a main body 102 that extends along the axial centerline 50 from a base 104 to a tip 106. The base 104 may be coupled (e.g., directly coupled) to an aft end of the inner shell 46. The tip 106 may be generally flat, planar, and/or generally parallel to the axial-circumferential plane of the gas turbine 10. The tip 106 may be the axial terminal end of the exhaust frequency mitigation apparatus 100. Particularly, the base 104 may be coupled to the aft end of the inner shell 46, e.g., via welding, brazing, threaded fasteners, or other means. The exhaust frequency mitigation apparatus 100 may be disposed within the exhaust flow passage 52. For example, the exhaust frequency mitigation apparatus 100 may partially define a radially inward flow boundary of the exhaust flow passage 52.

In exemplary embodiments, at least one rib 108 may extend from the main body 102 to a free end 110. Particularly, the at least one rib 108 may extend from a root 109 coupled to the main body (e.g., fixedly via welding or other means) to the free end 110. In many embodiments, the exhaust frequency mitigation apparatus 100 may include a plurality of ribs 108 circumferentially spaced apart from one another (e.g., equally spaced or unequally spaced) and extending from the main body 102. The ribs 108 may advantageously impede, intercept, or otherwise provide a blockage that disrupts the swirling flow within the exhaust flow passage 52 and prevents vibrations and/or frequency oscillations.

Figure 4:
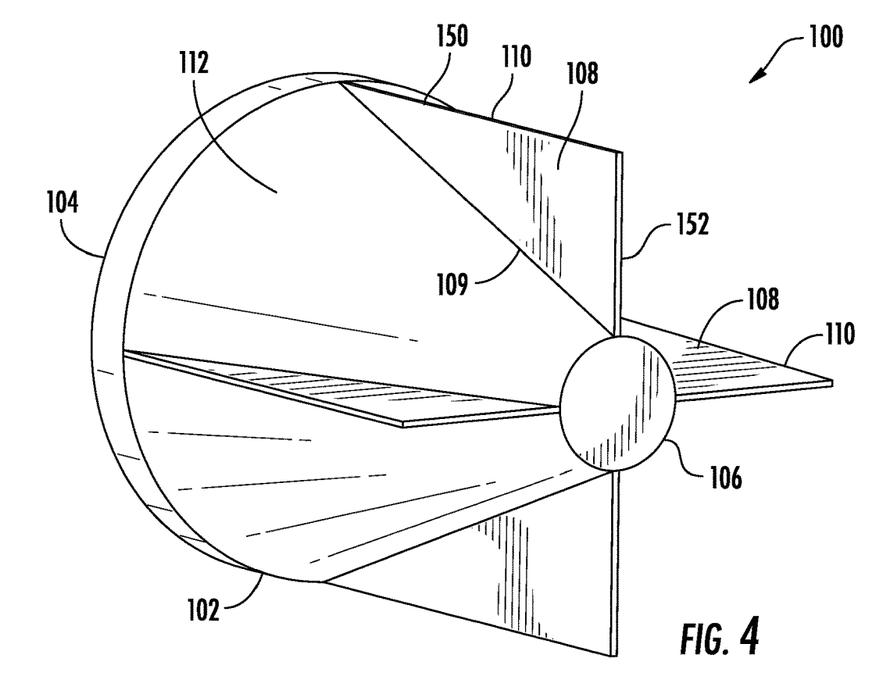
FIG. 4 illustrates a perspective view of an exhaust frequency mitigation apparatus in accordance with embodiments of the present disclosure.
Figure 5:
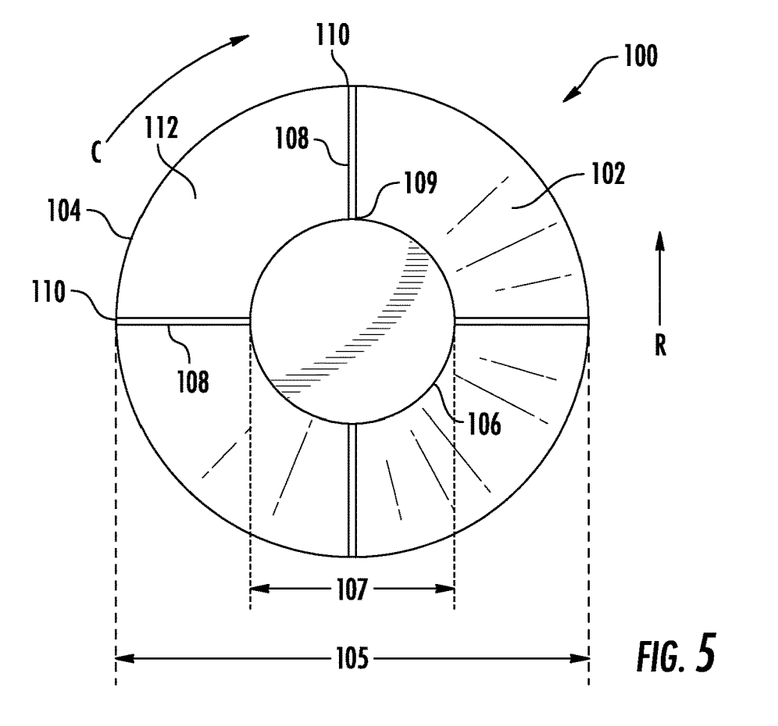
FIG. 5 illustrates a planar view of the exhaust frequency mitigation apparatus shown in FIG. 4 in accordance with embodiments of the present disclosure.

FIG. 4 illustrates a perspective view of an exhaust frequency mitigation apparatus 100, and FIG. 5 illustrates a planar view of the exhaust frequency mitigation apparatus 100 shown in FIG. 4 (e.g., from downstream looking upstream), in accordance with embodiments of the present disclosure. As shown in FIGS. 4 and 5 collectively, the main body 102 may be frustoconical, such that it tapers in diameter from the base 104 to the tip 106. In other embodiment, the main body 102 may be conically shaped, rectangularly shaped, tear drop shaped, or others. In exemplary embodiments, the main body 102 may define a generally circularly shaped cross-section.

In particular embodiments, the base 104 may define a first diameter 105, which may be generally equal (e.g., ±5%-10%) to a diameter of the inner shell 46 (as shown in FIG. 2). The tip 106 of the main body 102 may define a second diameter 107, and the second diameter 107 may be smaller than the first diameter 105. In exemplary embodiments, the main body 102 may converge from the first diameter 105 to the second diameter 107 with respect to the axial centerline. In other words, as the main body 102 extends axially form the base 104 to the tip 106, the main body 102 converges from the first diameter 105 to the second diameter 107. In some embodiments, the main body 102 may linearly converge (or taper) in diameter from the base 104 to the tip 106 such that an outer surface 112 of the main body 102 is straight in an axial-radial plane (as shown in FIGS. 11 through 14). Alternatively or additionally, the main body 102 may converge (or taper) in diameter from the base 104 to the tip 106 such that an outer surface 112 of the main body 102 is curved or arcuate in an axial-radial plane.

At least one rib 108 may extend from the main body 102 to a free end 110. Particularly, the at least one rib 108 may extend from a root 109 coupled to the main body (e.g., fixedly via welding or other means) to the free end 110. In various embodiments, as shown in FIGS. 4 and 5, the at least one rib 108 may be planar and define a uniform thickness from the main body 102 to the free end 110. For example, the at least one rib 108 may be a generally flat plate defining a thickness (e.g., a circumferential thickness) that is uniform or constant from root 109 to the free end 110.

Figure 6:
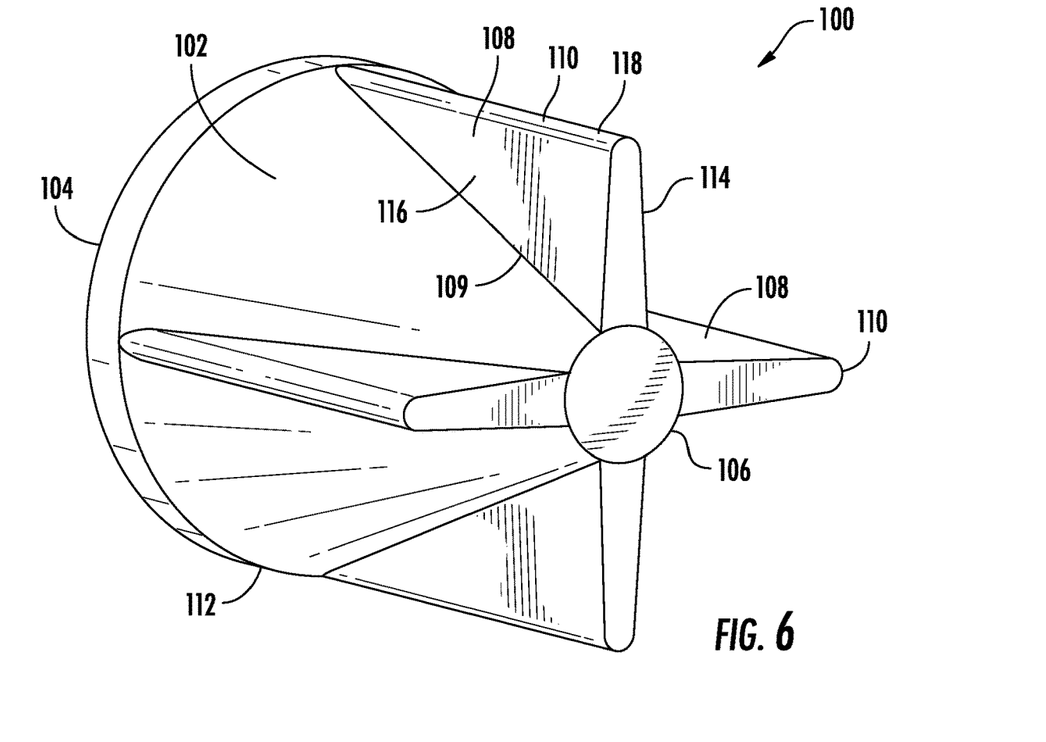
FIG. 6 illustrates a perspective view of an exhaust frequency mitigation apparatus in accordance with embodiments of the present disclosure.
Figure 7:
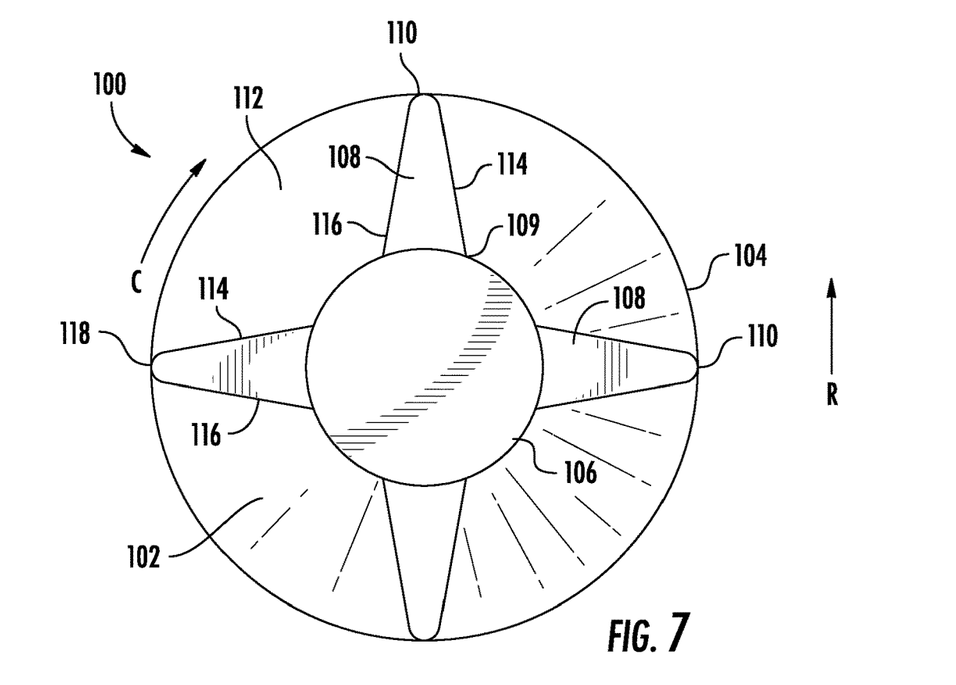
FIG. 7 illustrates a planar view of the exhaust frequency mitigation apparatus shown in FIG. 7 in accordance with embodiments of the present disclosure.

FIG. 6 illustrates a perspective view of an exhaust frequency mitigation apparatus 100, and FIG. 7 illustrates a planar view of the exhaust frequency mitigation apparatus 100 shown in FIG. 6 (e.g., from downstream looking upstream), in accordance with embodiments of the present disclosure. As shown in FIGS. 6 and 7 collectively, the at least one rib 108 may be a lobed rib. For example, the thickness of the at least one rib 108 may decrease (e.g., continually decrease) as the rib 108 extends radially from the root 109 to the free end 110. In various implementations, the at least one rib 108 may include a first wall 114, a second wall 116, and a rounded end 118. The thickness of the rib 108 may be defined an outer surface of the first wall 114 and the second wall 116. For example, the rib 108 may define a first thickness at the root 109 and a second thickness at the free end 110, and the second thickness may be smaller than the first thickness. In many embodiments, the first wall 114 and the second wall may be shaped as flat plates. The first wall 114 and the second wall 116 may be slanted towards one another, such that the thickness of the rib 108 decreases (e.g., continuously decreases) from the root 109 to the rounded end 118. Stated otherwise, the first wall 114 and the second wall 116 may converge towards each other as the walls 114, 116 extend from the root 109 to the rounded end 118. The rounded end 118 may be semicircular, arcuate, or otherwise curved. The rounded end 118 may extend between, and couple together, the first wall 114 and the second wall 116.

Figure 8:
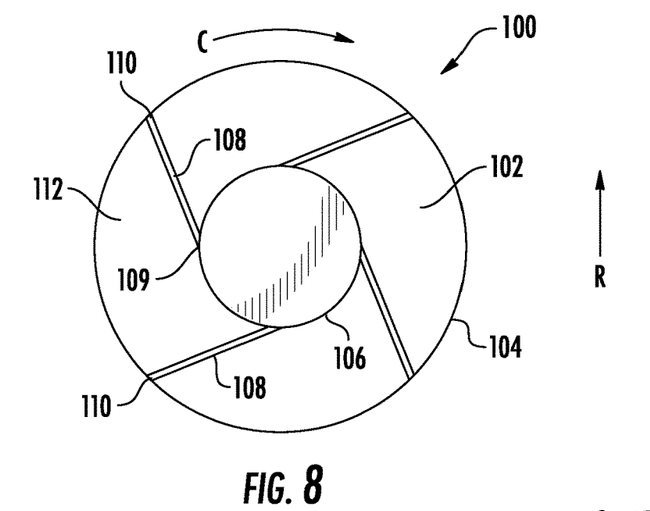
FIG. 8 illustrates a planar view of an exhaust frequency mitigation apparatus in accordance with embodiments of the present disclosure.
Figure 9:
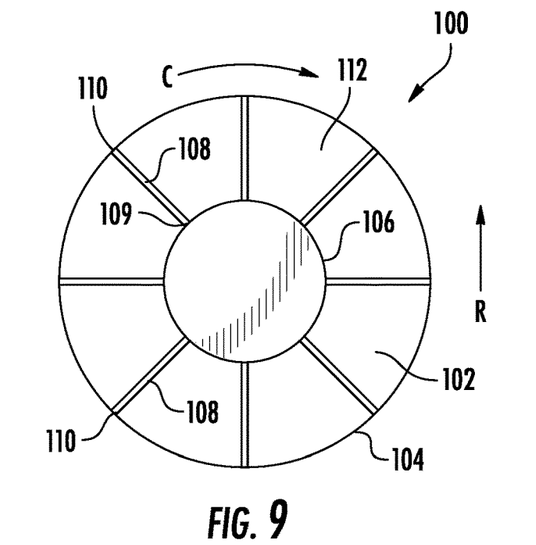
FIG. 9 illustrates a planar view of an exhaust frequency mitigation apparatus in accordance with embodiments of the present disclosure.
Figure 10:
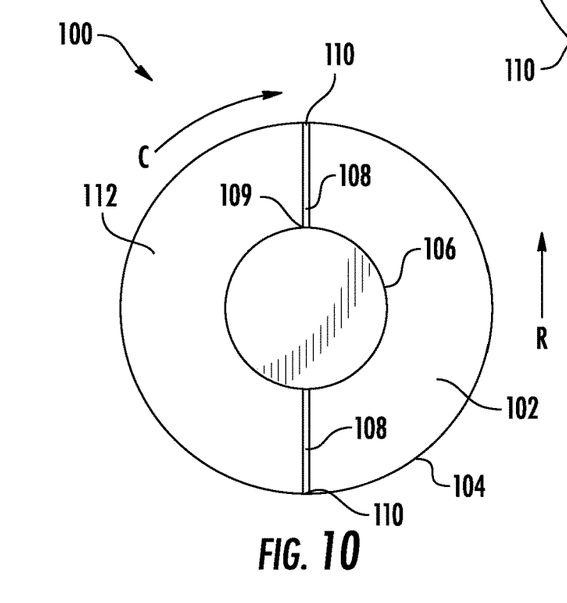
FIG. 10 illustrates a planar view of an exhaust frequency mitigation apparatus in accordance with embodiments of the present disclosure.

FIGS. 8 through 10 each illustrate a planar view of the exhaust frequency mitigation apparatus 100, in accordance with embodiments of the present disclosure. As shown in FIGS. 8 through 10 collectively, the exhaust frequency mitigation apparatus 100 may include two, four, or eight ribs 108. However, it should be understood that the exhaust frequency mitigation apparatus 100 may include any number of ribs 108 and should not be limited to any particular number of ribs 108 unless specifically recited in the claims. Particularly, the ribs 108 may be circumferentially spaced apart from one another (e.g., equally spaced apart or unequally spaced apart). In some embodiments, as shown, the ribs 108 may be arranged in one or more pairs diametrically opposed to one another.

In exemplary embodiments, the ribs 108 may each extend radially, such that they are generally aligned with the radial direction R from the root 109 to the free end 110. In other embodiments, such as the embodiment shown in FIG. 8, the ribs 108 may extend non-radially. For example, the ribs 108 may extend from the main body 102 generally oblique to the radial direction R. In some embodiments, the ribs 108 may extend tangentially from the main body 102. In other embodiments, the ribs 108 may extend as secant from the main body 102, such that an imaginary line along which the ribs 108 extends would intersect the circular cross-section of the main body 102 at two points.

Figures 11, 12, 13, 14:
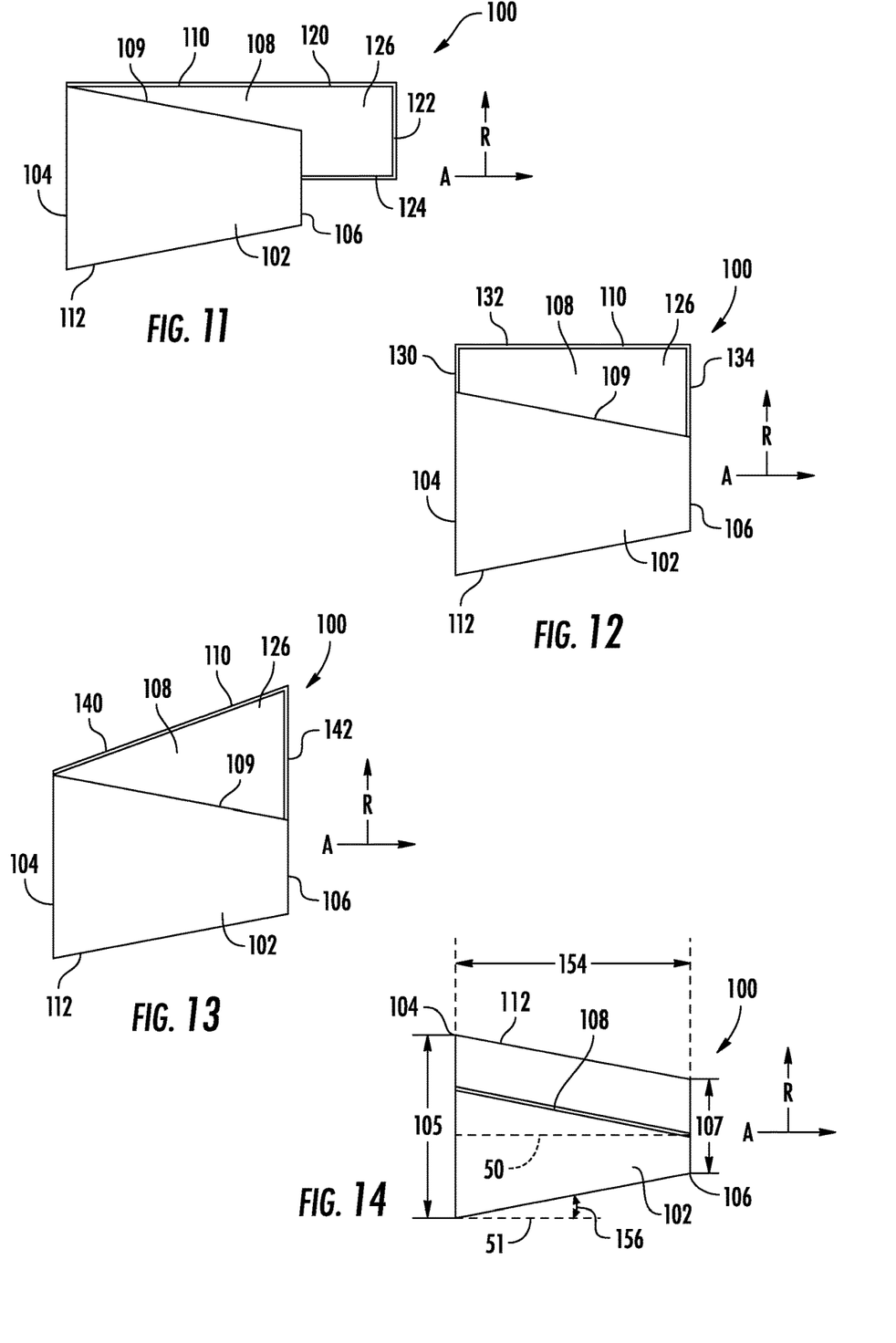
FIG. 11 illustrates a side view of an exhaust frequency mitigation apparatus in accordance with embodiments of the present disclosure.
FIG. 12 illustrates a side view of an exhaust frequency mitigation apparatus in accordance with embodiments of the present disclosure.
FIG. 13 illustrates a side view of an exhaust frequency mitigation apparatus in accordance with embodiments of the present disclosure.
FIG. 14 illustrates a side view of an exhaust frequency mitigation apparatus in accordance with embodiments of the present disclosure.

FIGS. 11 through 14 each illustrate a side view of the exhaust frequency mitigation apparatus 100, in accordance with embodiments of the present disclosure. As shown in FIGS. 11 through 13, the rib 108 may extend generally radially from the main body 102. In exemplary embodiments, as shown in FIG. 11, the rib 108 may not extend radially beyond the base 104 of the main body 102 (also shown in FIGS. 8 through 10). For example, the rib 108 may terminate radially inward of the base 104 (or the first diameter 105). In some embodiments, the rib 108 may terminate at the radial location (or radial level) of the base 104 or the first diameter 105. Alternatively, as shown in FIGS. 12 and 13, the rib 108 may extend radially beyond the base 104 (or the first diameter).

In various embodiments, the rib 108 may have a variety of shapes, such as triangular, rectangular, circular, or other. As shown in FIG. 11, the rib 108 may define a first edge 120, a second edge 122, and a third edge 124. The first edge 120 may extend generally axially from the base 104 to the second edge 122. The second edge 122 may extend generally radially between the first edge 120 and the third edge 124. The third edge 124 may extend generally axially between the second edge 122 and the tip 106 of the main body 102. As shown in FIG. 11, the rib 108 may include an overhang portion 126 that extends axially beyond the main body 102. Particularly, the overhang portion 126 may extend axially beyond the tip 106 of the main body 102. Similarly, as shown in FIGS. 12 and 13, the rib 108 may include an overhang portion 126 that extends radially beyond the main body 102. Particularly, the overhang portion 126 may extend radially beyond first diameter 105 of the main body 102.

As shown in FIG. 12, the rib 108 may define a first edge 130, a second edge 132, and a third edge 134. The first edge 130 may extend generally radially from the base 104 to the second edge 132. The second edge 122 may extend generally axially between the first edge 130 and the third edge 134. The third edge 134 may extend generally radially between the second edge 122 and the tip 106 of the main body 102.

As shown in FIG. 13, the rib 108 may define a first edge 140 and a second edge 142. The first edge 140 may extend from the base 104 of the main body 102, generally oblique to both the radial direction R and the axial direction A, to the second edge 142. The second edge 142 may extend generally radially from the first edge 140 to the tip 106 of the main body 102.

Referring back to FIG. 4 briefly, the rib 108 may define a first edge 150 and a second edge 152. The first edge 150 may extend from the base 104 of the main body 102 generally axially, and the second edge 152 may extend generally radially from the first edge 150 to the tip 106 of the main body 102. In this way, the first edge 150, the second edge 152, and an outer surface of the main body 102 may collectively define a triangular shape.

In many embodiments, such as those shown in FIGS. 1 through 13, the rib 108 may extend generally parallel to the axial centerline 50 as the rib 108 extends along the outer surface of the main body 102 from the base 104 to the tip 106. In other embodiments, such as the embodiment shown in FIG. 14, the rib 108 may extend non-parallel to the axial centerline 50 as the rib 108 extends along the outer surface of the main body 102 from the base 104 to the tip 106. In yet still further embodiments (not shown), the rib 108 may be configured as a spiral, such that the rib 108 extends annular around the main body 102 as it extends axially from the base 104 to the tip 106.

Additionally, as shown in FIG. 14, the main body 102 may define a length 154 (e.g., axial length) between the base 104 and the tip 106. In exemplary embodiments, the length 154 may be between about 35% and about 125% of the first diameter 105. In other embodiments, the main body 102 may define a length 154 (e.g., axial length) between the base 104 and the tip 106. In exemplary embodiments, the length 154 may be between about 50% and about 100% of the first diameter 105. In some embodiments, the main body 102 may define a length 154 (e.g., axial length) between the base 104 and the tip 106. In exemplary embodiments, the length 154 may be between about 65% and about 85% of the first diameter 105. In various embodiments, a convergence angle 156 may be defined between the outer surface 112 and an axial line 51 parallel to the axial centerline 50. For example, the convergence angle 156 may be between about 1° and about 50°, or such as between about 1° and about 45°, or such as between about 1° and about 40°, or such as between about 1° and about 35°, or such as between about 1° and about 30°, or such as between about 5° and about 30°, or such as between about 10° and about 30°.

Features of the exhaust frequency mitigation apparatus 100 shown in FIGS. 1 through 14 and described herein may be interchangeable with one another, such that features shown and described as part of one embodiment can be used with another embodiment to yield a still further embodiment. Thus, it is intended that the present disclosure covers such modifications and variations as come within the scope of the appended claims and their equivalents.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

An exhaust frequency mitigation apparatus comprising: a main body extending along an axial centerline from a base to a tip, the base defining a first diameter and the tip defining a second diameter, wherein the main body converges from the first diameter to the second diameter with respect to the axial centerline, and wherein the base is configured to extend from an inner shell of a turbomachine exhaust diffuser; and at least one rib extending from a root coupled to the main body to a free end.

The exhaust frequency mitigation apparatus as in one or more of these clauses, wherein the main body is frustoconical.

The exhaust frequency mitigation apparatus as in one or more of these clauses, wherein the free end of the at least one rib terminates radially inward of the first diameter.

The exhaust frequency mitigation apparatus as in one or more of these clauses, wherein the free end of the at least one rib terminates radially outward of the first diameter.

The exhaust frequency mitigation apparatus as in one or more of these clauses, wherein the at least one rib defines a thickness that is uniform from the root to the free end.

The exhaust frequency mitigation apparatus as in one or more of these clauses, wherein the at least one rib defines a thickness that decreases from the root to the free end.

The exhaust frequency mitigation apparatus as in one or more of these clauses, wherein the main body comprises an outer surface, wherein a convergence angle is defined between the outer surface and an axial line parallel to the axial centerline, and wherein the convergence angle is between about 1° and about 50°.

The exhaust frequency mitigation apparatus as in one or more of these clauses, wherein the main body defines a length that is between about 35% and about 125% of the first diameter.

The exhaust frequency mitigation apparatus as in one or more of these clauses, wherein the at least one rib extends generally radially from the main body.

The exhaust frequency mitigation apparatus as in claim 1, wherein the at least one rib extends from the main body generally oblique to a radial direction.

The exhaust frequency mitigation apparatus as in one or more of these clauses, wherein the at least one rib includes an overhang portion that extends beyond the main body.

An exhaust diffuser comprising: an inner shell; an outer shell radially spaced apart from the inner shell such that an exhaust flow passage is defined therebetween; one or more struts disposed within the exhaust flow passage and extending between the inner shell and the outer shell; and an exhaust frequency mitigation apparatus extending from the inner shell, the exhaust frequency mitigation apparatus comprising: a main body extending along an axial centerline from a base to a tip, the base defining a first diameter and the tip defining a second diameter, and wherein the main body converges from the first diameter to the second diameter with respect to the axial centerline; and at least one rib extending from a root coupled to the main body to a free end.

The exhaust diffuser as in one or more of these clauses, wherein the main body is frustoconical.

The exhaust diffuser as in one or more of these clauses, wherein the free end of the at least one rib terminates radially inward of the first diameter.

The exhaust diffuser as in one or more of these clauses, wherein the free end of the at least one rib terminates radially outward of the first diameter.

The exhaust diffuser as in one or more of these clauses, wherein the at least one rib defines a thickness that is uniform from the root to the free end.

The exhaust diffuser as in one or more of these clauses, wherein the rib defines a thickness that decreases from the root to the free end.

The exhaust diffuser as in one or more of these clauses, the main body comprises an outer surface, wherein a convergence angle is defined between the outer surface and an axial line parallel to the axial centerline, and wherein the convergence angle is between about 1° and about 50°.

The exhaust diffuser as in one or more of these clauses, wherein the main body defines a length that is between about 35% and about 125% of the first diameter.

A turbomachine comprising: a compressor section; a combustion section disposed downstream of the compressor section; a turbine section disposed downstream of the combustion section; and an exhaust diffuser disposed downstream of the turbine section, the exhaust diffuser comprising: an inner shell; an outer shell radially spaced apart from the inner shell such that an exhaust flow passage is defined therebetween; one or more struts disposed within the exhaust flow passage and extending between the inner shell and the outer shell; and an exhaust frequency mitigation apparatus extending downstream from the inner shell, the exhaust frequency mitigation apparatus comprising: a main body extending along an axial centerline from a base to a tip, the base defining a first diameter and the tip defining a second diameter, and wherein the main body converges from the first diameter to the second diameter with respect to the axial centerline; and at least one rib extending from a root coupled to the main body to a free end.

What is claimed is:

1. An exhaust frequency mitigation apparatus comprising: a main body extending along an axial centerline from a base to a tip, the base defining a first diameter and the tip defining a second diameter, wherein the main body converges from the first diameter to the second diameter with respect to the axial centerline, and wherein the base is configured to extend from an inner shell of a turbomachine exhaust diffuser; and
at least one rib extending from a root coupled to the main body to a free end, wherein the at least one rib extends along the main body from the base to the tip, and wherein the free end is disposed at a radial location of the first diameter.

2. The exhaust frequency mitigation apparatus as in claim 1, wherein the main body is frustoconical.

3. The exhaust frequency mitigation apparatus as in claim 1, wherein the at least one rib defines a thickness that is uniform from the root to the free end.

4. The exhaust frequency mitigation apparatus as in claim 1, wherein the at least one rib defines a thickness that decreases from the root to the free end.

5. The exhaust frequency mitigation apparatus as in claim 1, wherein the main body comprises an outer surface, wherein a convergence angle is defined between the outer surface and an axial line parallel to the axial centerline, and wherein the convergence angle is between about 1° and about 50°.

6. The exhaust frequency mitigation apparatus as in claim 1, wherein the main body defines a length that is between about 35% and about 125% of the first diameter.

7. The exhaust frequency mitigation apparatus as in claim 1, wherein the at least one rib extends generally radially from the main body.

8. The exhaust frequency mitigation apparatus as in claim 1, wherein the at least one rib extends from the main body generally oblique to a radial direction.

9. The exhaust frequency mitigation apparatus as in claim 1, wherein the at least one rib includes an overhang portion that extends beyond the main body.

10. The exhaust frequency mitigation apparatus as in claim 1, wherein the rib includes a first edge and a second edge, wherein the first edge extends from the base to the second edge, and wherein the second edge extends from the first edge to the tip.

11. The exhaust frequency mitigation apparatus as in claim 10, wherein the first edge extends axially and the second edge extends radially.

12. The exhaust frequency mitigation apparatus as in claim 10, wherein the first edge extends generally axially from the base to the second edge at the radial location of the first diameter.

13. An exhaust diffuser comprising:
an inner shell;
an outer shell radially spaced apart from the inner shell such that an exhaust flow passage is defined therebetween;
one or more struts disposed within the exhaust flow passage and extending between the inner shell and the outer shell; and
an exhaust frequency mitigation apparatus extending from the inner shell, the exhaust frequency mitigation apparatus comprising:
a main body extending along an axial centerline from a base to a tip, the base defining a first diameter and the tip defining a second diameter, and wherein the main body converges from the first diameter to the second diameter with respect to the axial centerline; and
at least one rib extending from a root coupled to the main body to a free end,
wherein the at least one rib extends along the main body from the base to the tip, and wherein the free end is disposed at a radial location of the first diameter.

14. The exhaust diffuser as in claim 13, wherein the main body is frustoconical.

15. The exhaust diffuser as in claim 13, wherein the at least one rib defines a thickness that is uniform from the root to the free end.

16. The exhaust diffuser as in claim 13, wherein the rib defines a thickness that decreases from the root to the free end.

17. The exhaust diffuser as in claim 13, the main body comprises an outer surface, wherein a convergence angle is defined between the outer surface and an axial line parallel to the axial centerline, and wherein the convergence angle is between about 1° and about 50°.

18. The exhaust diffuser as in claim 13, wherein the main body defines a length that is between about 35% and about 125% of the first diameter.

19. A turbomachine comprising:
a compressor section;
a combustion section disposed downstream of the compressor section;
a turbine section disposed downstream of the combustion section; and
an exhaust diffuser disposed downstream of the turbine section, the exhaust diffuser comprising:
an inner shell;
an outer shell radially spaced apart from the inner shell such that an exhaust flow passage is defined therebetween;
one or more struts disposed within the exhaust flow passage and extending between the inner shell and the outer shell; and
an exhaust frequency mitigation apparatus extending downstream from the inner shell, the exhaust frequency mitigation apparatus comprising:
a main body extending along an axial centerline from a base to a tip, the base defining a first diameter and the tip defining a second diameter, and wherein the main body converges from the first diameter to the second diameter with respect to the axial centerline; and
at least one rib extending from a root coupled to the main body to a free end, wherein the at least one rib extends along the main body from the base to the tip, and wherein the free end is disposed at a radial location of the first diameter.

* * * * *